Sept. 10, 1968      H. W. GRACE      3,400,779
FLEXIBLE WALL STRUCTURE FOR AIR CUSHION VEHICLES
Filed May 17, 1966      5 Sheets-Sheet 1
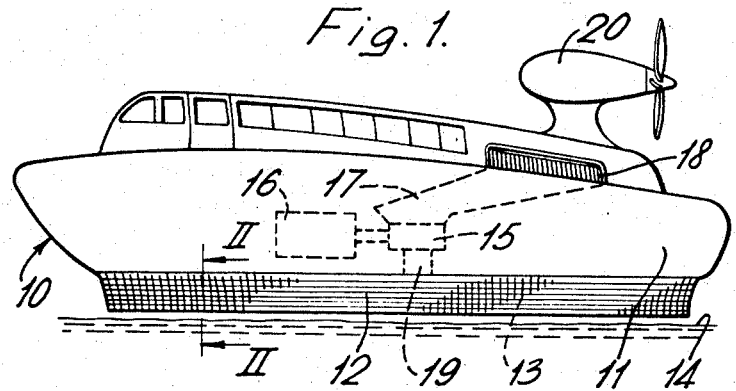
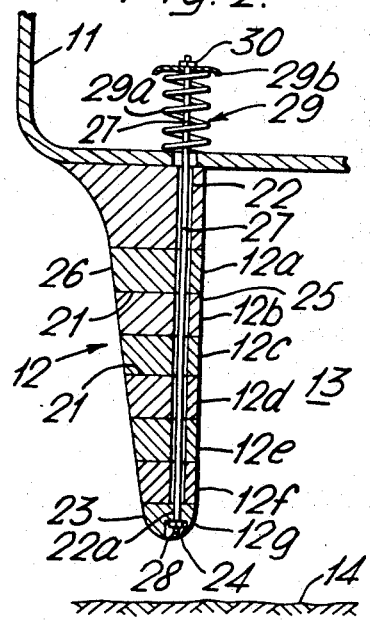
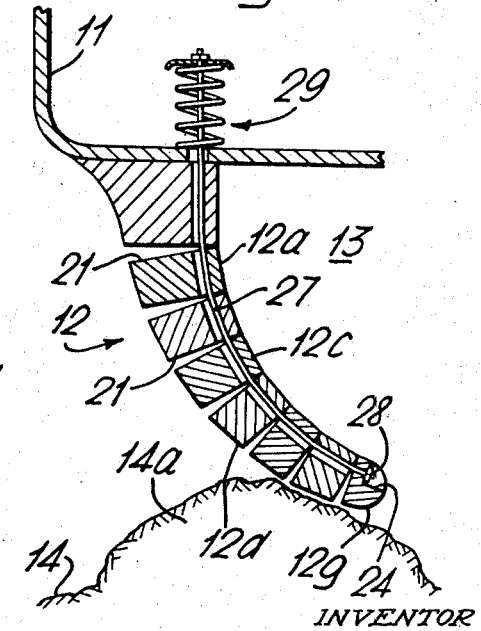
INVENTOR
H. W. GRACE
BY
Cameron, Kerkam & Sutton
ATTORNEY

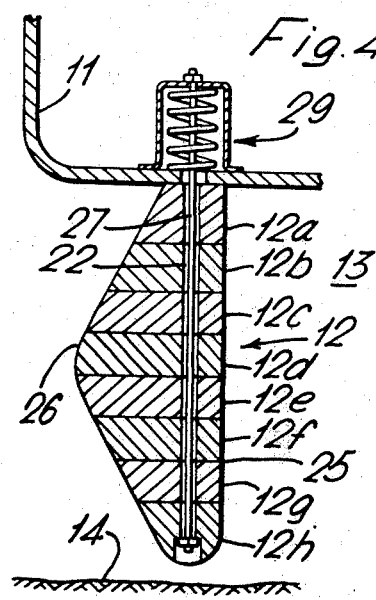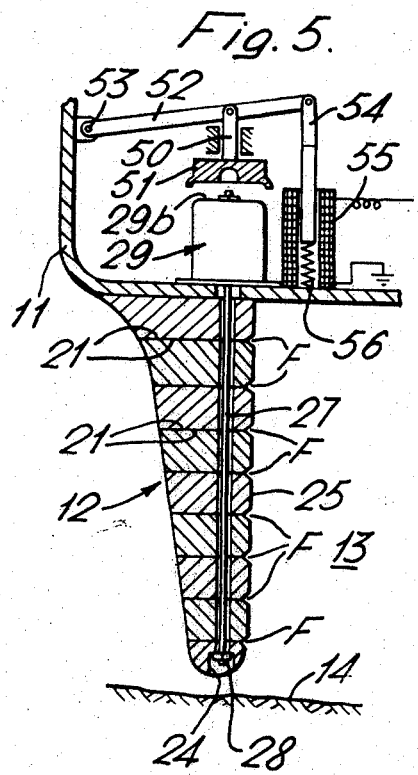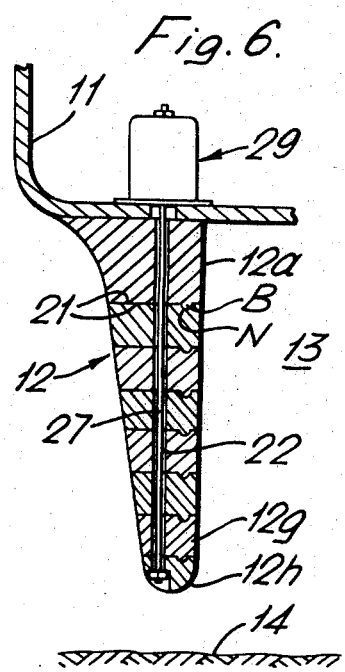

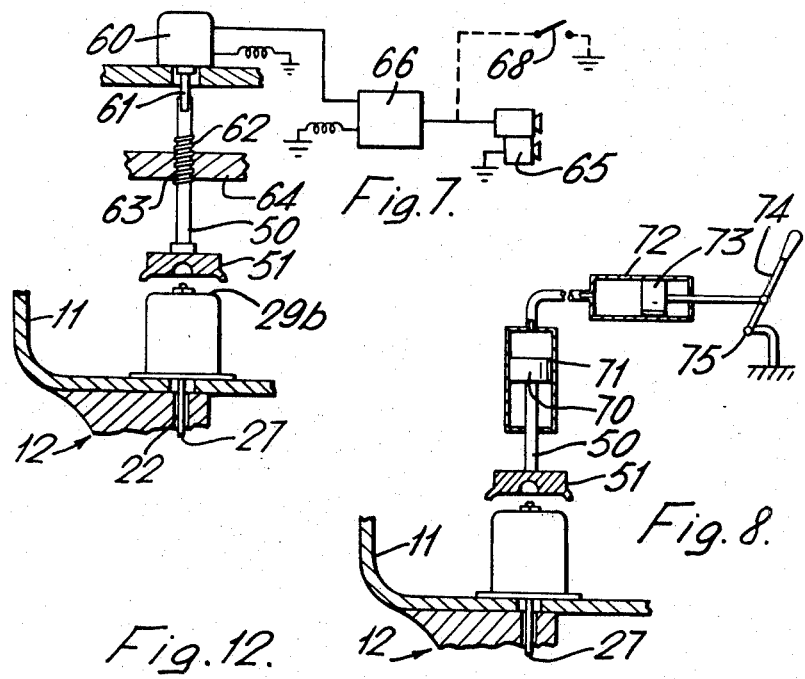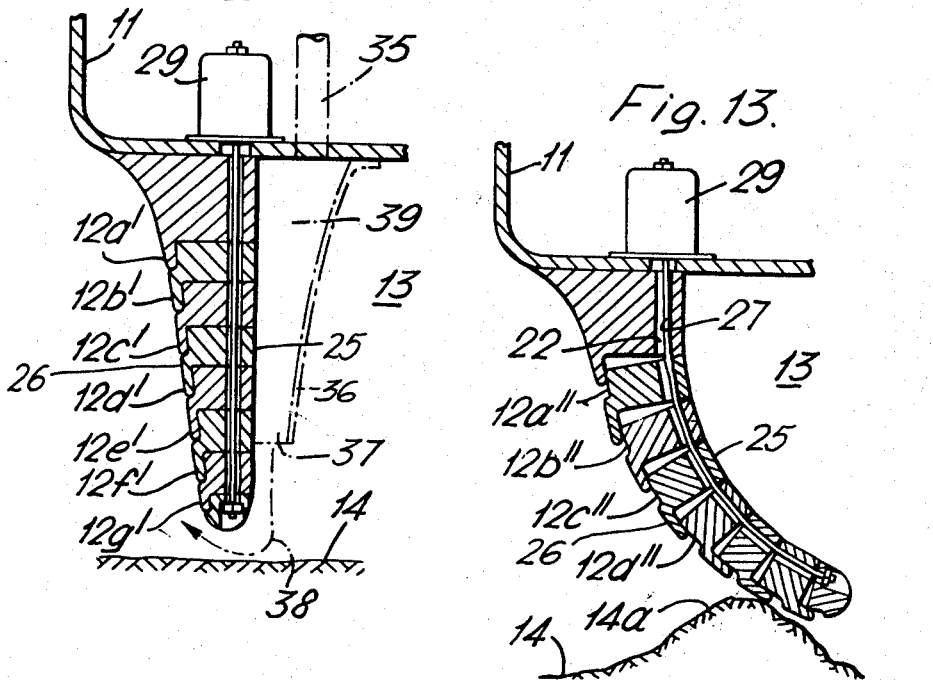

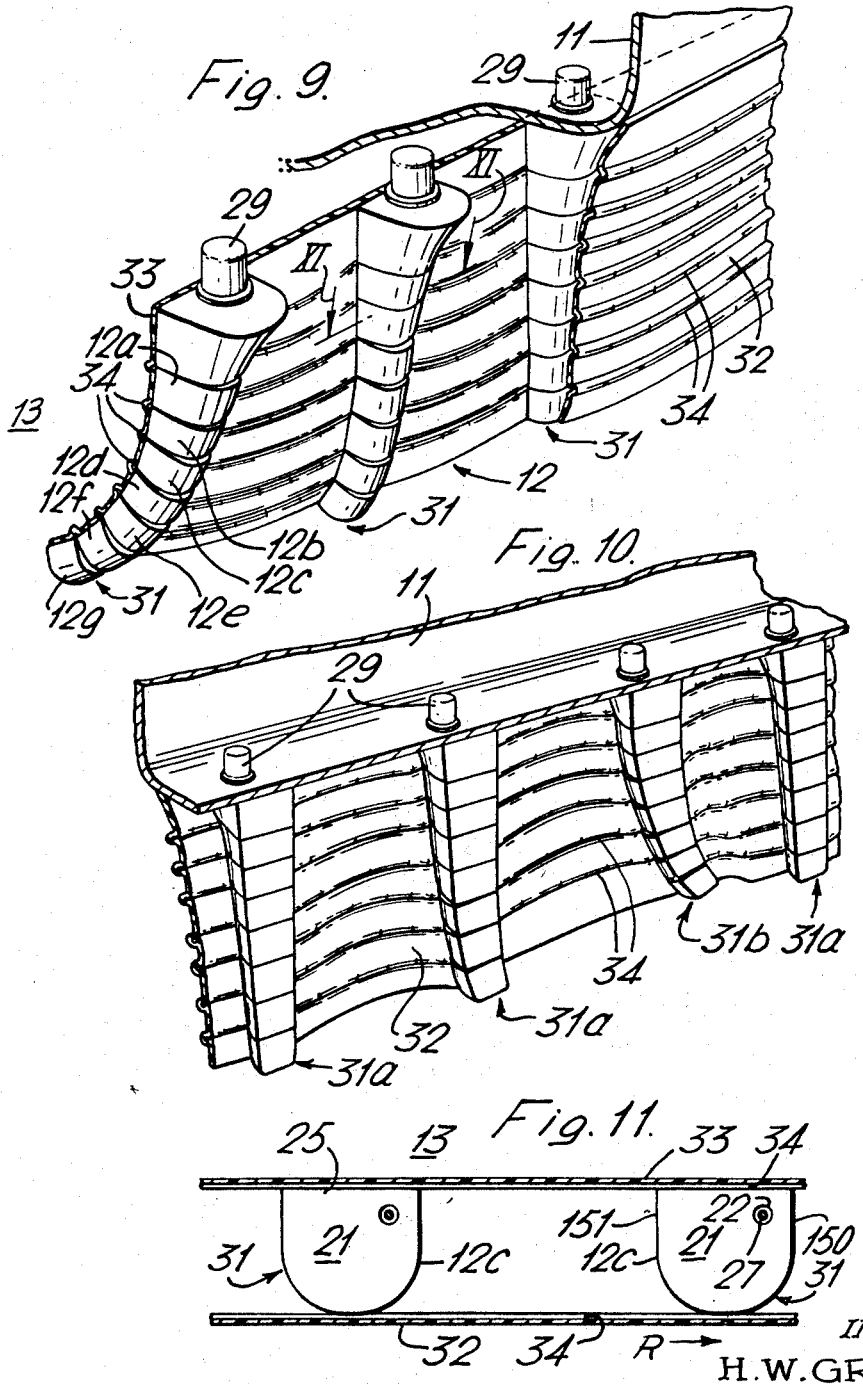

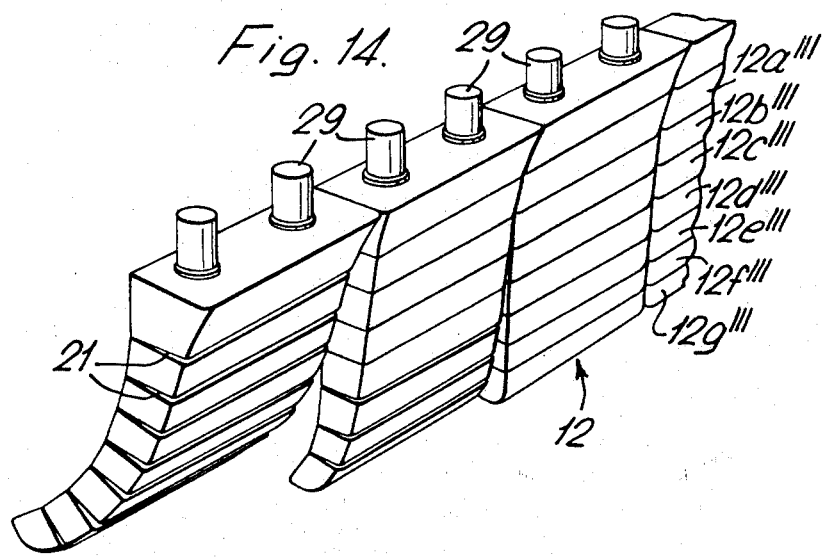
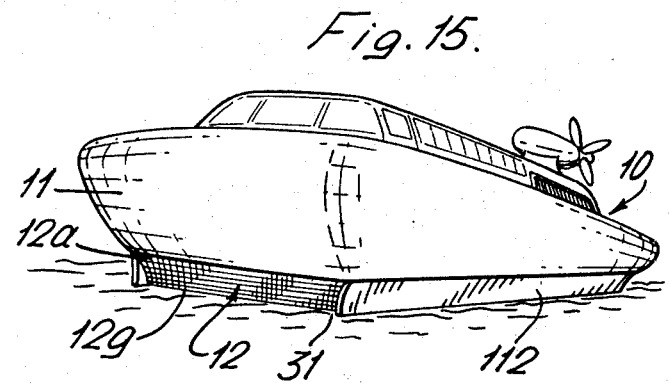
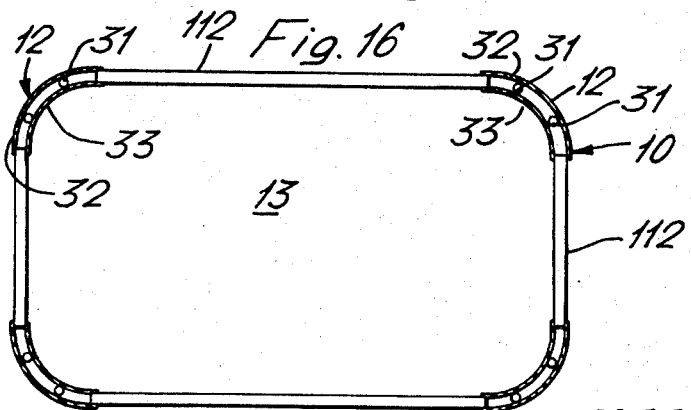

United States Patent Office 3,400,779
Patented Sept. 10, 1968

3,400,779
FLEXIBLE WALL STRUCTURE FOR AIR CUSHION VEHICLES
Herbert Willoughby Grace, Northwood, Middlesex, England, assignor to Hovercraft Development Limited, London, England, a British company
Filed May 17, 1966, Ser. No. 550,793
Claims priority, application Great Britain, May 25, 1965, 22,265/65
20 Claims. (Cl. 180—118)

ABSTRACT OF THE DISCLOSURE

A gas cushion vehicle is provided with a flexible wall structure for laterally containing at least part of the gas cushion which includes one or more stacks of individually formed wall members mounted one on top of the other, each stack including a flexible wire fixed to the wall member at the bottom of the stack and extending upwardly through the stack, and means for resiliently maintaining the wire under tension so as to normally urge adjacent wall members of the stack into abutment with each other. The stacks either are arranged to form a substantially continuous wall structure, or are spaced apart and provided with a flexible impervious membrane which forms a gas-tight enclosure for the cushion. The individual wall members in each stack are arranged to be angularly deflected relative to one another, and may be so constructed that some members may be deflected more easily than others in specified directions. The wall structure may also be provided with means for varying the tension in the wire of each stack so as to vary the resistance of the members of the stack to deflection when the vehicle passes over obstacles.

---

The present invention relates to flexible wall structures for gas cushion vehicles; that is to say, vehicles which, during operation, are supported on at least one cushion of pressurised gas maintained in a space beneath the body of the vehicle. Generally speaking vehicles of this type comprise some means, such as a fan, for continuously supplying gas to the cushion space in order to make up for losses of gas from the cushion space and thus to maintain the cushion pressure. In order to laterally contain the pressurised gas in the cushion, there is usually provided a containing wall which extends downwardly from the body of the vehicle and forms at least part of the peripheral boundary of the cushion space. It will be appreciated that the containing wall will need to resist the outward pressure forces of the gas cushion. On the other hand if the containing wall comes into contact at any time with the surface over which the vehicle is travelling it is desirable that the wall should be able to deform fairly readily to yield the forces of impact so as to avoid damage to the wall.

Accordingly, at least the lower part of the containing wall has in the past comprised various flexible arrangements usually incorporating a flexible sheet material, such as rubber or rubberised fabric which is inflated, for example, by the cushion pressure and which can therefore yield on impact.

It is an object of the present invention to provide a containing wall which will combine a suitable degree of flexibility with a sufficient degree of stiffness to meet the above operational requirements.

According to the present invention, there is provided a flexible wall structure for laterally containing the vehicle-supporting cushion of a gas-cushion vehicle, the wall structure including a part constructed from a plurality of wall members arranged one against the other to form a stack, adjacent wall members being urged into abutment by a tensioned flexible element which engages the lowest wall member and extends through the stack and is retained by retaining means whereby the tension is maintained in the tensioned element.

Adjacent wall members in the stack may be provided with substantially flat faces which normally co-operate with each other and at least some of the flat faces of the wall members in the stack may have differing dimensions peripherally and/or laterally with respect to the gas cushion whereby some wall members will be angularly deflected peripherally and/or laterally, with respect to the gas cushion more easily than other wall members in the stack, or fulcra may be formed on the face of one member in the form of a raised bead which may bear on a flat face of the adjacent member or may co-operate with a rotary groove or notch on the adjacent face.

It will be appreciated that for a given tension in the flexible element, the effort required to angularly displace one member in the stack relative to an adjacent member in the stack is dependent on the distance of the point of application of the restoring force provided by the flexible element from the fulcrum about which the angular displacement takes place. In the case where the co-operating faces of the members are flat, the fulcrum will be at an edge of the co-operating face of the angularly displaced member, depending on the direction of the displacing force, and thus the effort for angular displacement will depend on the lateral extent of the co-operating faces of the members from the flexible element. The relative lateral extent of the co-operating faces from the flexible element on opposite sides of a member is determined by the profiles of the members between their respective co-operating faces. Hence, by forming each of the members of a stack with a predetermined profile between its co-operating faces, and disposing the flexible element at a selected distance from the inner and outer edges, the effort required for angular displacement of each member relative to its neighbours can be arranged to suit the operational requirements for each member according to its position in the flexible wall structure as a whole.

The flexible wall structure may include at least one wall member in the stack having a side provided with a chamfer defining an edge of a flat face thereof so as to form a fulcrum for said member closer to the flexible element than the said side of the member; thus the member may be angularly deflected about the fulcrum provided by the chamfer edge more easily than it would were it to pivot about an edge at the full width of the member, but without too much reducing the cross-section of the member and thus weakening it.

There may be at least one wall member in the stack provided with a projection which overlaps the adjacent wall member to prevent the ingress of debris between the members.

In at least one wall member the flexible element may pass nearer to one side than to the opposite side thereof, whereby the wall member may be angularly deflected more easily to the said one side than to the opposite side.

The flexible element may be either relatively inextensible or resiliently extensible and it may be anchored to resilient means for maintaining the tension therein.

There may be provided means for temporarily relieving the tension in the flexible element during operational use. The tension in the flexible element may be provided by a compression spring and the said means may be operable to compress the spring to relieve the tension in the flexible element.

The said means may comprise a jack operable by a screw or pneumatic or electrical means and there may be control means for operating said jack in response to a signal indicative of an obstacle in the path of the vehicle.

There may be provided a flexible impervious membrane constituting a gas-tight seal between at least two adjacent wall members of a stack and there may be a plurality of spaced-apart struts, each in the form of a stack, and a cushion-containing membrane of flexible sheet material extending between at least two adjacent struts.

The wall structure may include a plurality of stacks of wall members whose lengths, in directions peripherally of the gas cushion are relatively large in comparison to their widths in lateral directions.

The present invention also provides, in another aspect, a gas cushion vehicle in which the lateral containment of the gas cushion is provided by a flexible wall structure as hereinbefore described. The vehicle may comprise a body, a wall depending from each side of the body, and transverse walls depending from the front of the body and the rear of the body to define at least part of the lateral boundary of a space beneath the body for the vehicle-supporting gas cushion, and a flexible wall structure as hereinbefore described connecting an end of each side wall to the adjacent transverse walls, the stack of each flexible wall structure serving to maintain a desired configuration of a flexible impervious membrane extending between the side wall and the transverse wall.

According to a further aspect of the present invention, there is provided a vehicle in which the flexible wall structure provides the lateral containment of the vehicle supporting cushion at the sides of the vehicles.

It will be appreciated that during the motion of the vehicle, the deflections of the wall caused by passage of the vehicle over obstacles, if towards the cushion space, will be resisted by the cushion pressure. On the other hand deflections outwardly from the cushion space will be assisted by the cushion pressure. It is therefore desirable that the wall structures be arranged to yield more readily towards the cushion space than away from it so as to compensate this effect. This can be achieved with structures according to the invention by suitably designing the profiles of the wall members constituting a stack and the position at which the flexible element passes through them.

The invention will now be described, by way of a number of non-limitative examples thereof, with reference to the accompanying drawings, in which:

FIGURE 1 is a side elevation of a vehicle in accordance with the invention,

FIGURE 2 is a schematic section through the lower part of the vehicle of FIGURE 1, taken on line II—II and showing a part of a flexible wall structure, FIGURE 3 shows the manner in which the part of the wall structure of FIGURE 2 deflects on contact with an obstacle, FIGURE 4 shows an exemplary adaption of the part of the wall structure of FIGURE 2 and 3 having non-uniform deflection characteristics, FIGURE 5 shows a modification of the part of the wall structure shown in FIGURES 2 and 3 and incorporating a system for controlling the tension in a wire used in the wall structure, FIGURE 6 is a modified version of the wall structure of FIGURE 5, FIGURE 7 shows an alternative control system to that of FIGURE 5, FIGURE 8 shows a further control system, FIGURE 9 shows a schematic perspective view of the part of the wall of FIGURES 2 and 3 incorporated in a flexible wall, some parts being deflected and other parts undeflected, FIGURE 10 is a perspective view from inside the cushion space of the wall of FIGURE 9, with an inner membrane removed, FIGURE 11 is a view taken on the line XI—XI of FIGURE 9, showing a wall member adapted to have varying directional deflection characteristics, FIGURE 12 is a section corresponding to that of FIGURE 2 but of another embodiment, and FIGURE 13 shows the wall of FIGURE 12 in its deflected configuration, FIGURE 14 shows another form of a flexible wall structure according to the invention, FIGURE 15 is a perspective view from the front of another vehicle in accordance with the invention, and FIGURE 16 shows a schematic underneath plan view of another form of vehicle according to the invention.

In the drawings, features which are similar in each figure will be given the same reference numeral, and referring now to FIGURE 1, there is shown a vehicle, generally designated by reference 10, comprising a body 11, and a wall 12 attached to the body 11 around the bottom periphery thereof to define a space 13 between the body 11 and a surface 14 over which the vehicle 10 is to travel. Within the body 11 is provided a fan 15 which is driven by a motor 16. The fan 15 induces air through duct 17 from intake 18, pressurises the air and delivers it through one or more delivery ducts 19 (only one of which is shown) to the space 13 where it forms a cushion of pressurised gas which can support the vehicle 10 out of contact with surface 14. Pressurised air continuously escapes between the wall 12 and the surface 14, and the cushion of air in space 13 is maintained by the continuous operation of the fan 15. The vehicle 10 is propelled over the surface 14 by a propulsion unit 20, which in this embodiment includes an air-screw propeller.

Referring now to FIGURE 2, the section of the wall 12 is seen to comprise a number of wall members, 12a, 12b, 12c . . . 12g, arranged in a stack, the members having one or more flat surfaces 21 facing respectively towards or away from the body 11. Each flat surface 21 of one member 12a . . . 12f co-operates with the adjacent flat surface 21 of the next member 12a . . . 12f. Each wall member 12a . . . 12f is formed with a passage 22 between the flat surfaces 21. Member 12g has a passage 22a between its upper flat surface 21 and its lower rounded surface 23, the passage 22a being restricted towards the upper flat surface 21 so as to form an internal shoulder 24. The respective passages 22, 22a are all in register and are nearer to those faces 25 of the members 12a . . . 12g which bound the cushion space 13 than to the faces 26 which are directed outwardly from the cushion space 13. A length of wire 27, or some other like flexible element, is threaded through the passages 22, 22a, and a nipple 28, or a like means, is attached to the lower end of wire 27 to engage against shoulder 24 and thereby prevent wire 27 from being drawn up through the passages 22, 22a. The upper end of wire 27 is engaged by a spring unit, generally indicated by reference 29, or a like biassing means, which is arranged to produce tension forces in the wire 27. The spring unit 29 comprises a spring 29a which is normally under compression between a part of body 11 and a retaining plate 29b, and the spring 29a is maintained in compression by the engagement of a nipple 30, attached to the upper end of wire 27, with the retaining plate 29b. It will be appreciated that any means capable of generating tension forces, including pneumatic and elastomeric arrangements, may be substituted for unit 29, and further that the nipples 28, 30 may be replaced by threaded washers which can be adjusted on threads provided on wire 27, to adjust the tension in wire 27.

Referring now to FIGURE 3, it will be seen that when the section of the wall 12 abuts an obstacle 14a on surface 14 which is outside space 13, the members 12a . . . 12g are deflected inwardly against the bias provided by the tension in wire 27 which tends to urge the wall 12 back to the configuration of FIGURE 2. In the case (not shown) where the obstacle to be negotiated lies within the cushion space 13, the section of the wall 12 is deflected outwardly in much the same manner, but it will be appreciated that since the deflecting force for each member 12a . . . 12g is a function of the distance between the wire 27 and the fulcrum about which the member turns, the forces for inward deflection will be smaller in the illustrated embodiment than the forces for outward deflection. This is useful in that the pressure of the cushion acting against the inward face of the wall 12 is the less likely to deflect the wall 12 outwardly and thus lead to gas loss from the cushion space 13. However, at the rear of the vehicle 10, most obstacles would be moving outwardly from the cushion space 13 under wall 12 as the vehicle 10 progressed forwardly. Therefore at the rear of the vehicle, there would be some advantage in arranging that the passage 22, and therefore the wire 27, is nearer to the outwardly directed faces 26 of the members 12a . . . 12g than to the inwardly directed faces 25.

FIGURE 4 shows a modified version of the embodiment of FIGURES 2 and 3, in which the profile of the wall members 12a . . . 12h varies to provide a resistance to deflection which varies along the length of the section of the wall 12. Thus, for member 12a, in which the tension force of wire 27 is applied near to the outer face 26 of the section of the wall 12, the resistance to inward deflection will be greater than the resistance to outward deflection. This is less true of member 12b where the wire 27 is, on average, disposed more or less along the centre-line of member 12b. In the case of members 12c to 12g the wire 27 is nearer to inner faces 25 than to the outer faces 26. Consequently, the moment of the tension forces of wire 27 about the fulcrum formed by the edge between the co-operating faces 21 and the inner face 25 will be smaller than the moment of the forces about the fulcrum formed by the edge between the co-operating faces 21 and the outer face 26, and for members 12c to 12g, the effort for inward deflection will be smaller than the effort for outward deflection.

In some cases, it may be desired that the fulcrum about which the relative angular displacement of adjacent wall members takes place should be very close to the wire 27. In the embodiments of FIGURES 2, 3 and 4, the members 12a . . . 12g would accordingly be relatively weak due to the small dimension between the aperture 22 in which wire 27 is received, and (for example) the inner face 25 of the wall 12.

FIGURE 5 shows an embodiment in which the fulcrum F, about which adjacent wall members turn is near to the wire 27 without the sacrifice of much of the strength of the members. It will be seen that the flat surfaces 21 all terminate at an inwardly chamfered portion of the inner face 25.

In FIGURE 6 a fulcrum may be provided in the otherwise flat faces 21 of the wall members 12a . . . 12h in the form of a raised bead B which, as shown, co-operates with a notch or groove N on the co-operable face of the adjacent member. The fulcrum thus provided may be disposed as close to the wire 27 as is required without substantially weakening the wall members involved.

The wall structure 12 of FIGURE 5 incorporates a control system for varying the tension in the wire 27 to vary the effort required to deflect the members 12a . . . 12g. The control system comprises a jack 50 having a head 51 adapted for engaging the retaining plate 29b. The jack 50 is pivotally connected to an actuating lever 52, one end of which is pivotally mounted to the vehicle body 11 at 53 and the other end of which is pivotally connected to a plunger 54 forming part of the core of a solenoid 55. The plunger 54 is upwardly biassed by a spring 56, but when current is supplied to the windings of the solenoid 55, the plunger 54 is pulled downwardly, pulling the lever 52 down, and causing the head 51 of jack 50 to engage and press the retaining plate 29b downwardly, thus reducing the tension in wire 27, so that the effort required to deflect the wall members 12a . . . 12g is reduced.

The ability to thus reduce the tension in the wire 27 is useful when the vehicle 10 is to progress over obstacles such as large waves or rocks, since the impact between the obstacle and the resisting wall structure 12 can be minimised. In FIGURE 7, the jack 50 is rotated by an electric motor 60 through a key-shaft 61 received in a slot in the jack 50. The jack 50 is provided with threads 62 which co-operate with threads 63 of a stationary unit 64. Thus when the motor 60 is supplied with electric current, the jack 50 is rotated and is either raised or lowered into contact with the retaining plate 29b to reduce the tension in the wire 27, depending on the direction of rotation.

Where it is particularly intended that the tension in wire 27 should be reduced to reduce impact with waves, a wave detecting unit 65 is provided, and signals indicative of the approach of waves having greater than a given amplitude are supplied to a servo-switch device 66 which then connects the electric power source (not shown) of the vehicle 10 to the electric motor 60 to cause the jack 50 to be lowered. If required, a manual control, indicated schematically by switch 68, may be provided in addition, or alternatively.

In FIGURE 8, the raising and lowering of jack 50 is accomplished hydraulically. The jack 50 is attached to the piston 70 of a hydraulic ram 71, and the position of piston 70 in the ram 71, and thus the position of the jack 50, is controlled by a regulating ram 72 the piston 73 of which is moved by a lever 74 pivoted at 75 to the vehicle body 11. The lever 74 may be moved manually or by suitable power means (not shown) to move the jack 50 and thus vary the tension in wire 27.

Referring now to FIGURE 9, it will be seen that each wall member 12a . . . 12g forms part of a strut 31 and that there are a number of spaced apart struts 31 formed from stacks of wall members 12a . . . 12g. The struts 31 can be deflected independently of each other. Each strut 31 has a spring unit 29. A membrane 32 (which is partly broken away in FIGURE 8 for the sake of illustration) in the form of a sheet of flexible material such as rubber or rubberised fabric is attached to, and covers, the outwardly directed faces 26 of the wall members 12a . . . 12g and forms the lateral boundary of the cushion space 13 between the struts 31. Another membrane 33 is used to cover the inwardly directed faces 25 in order that debris will be prevented from accumulating between the co-operating faces 21. The membranes 32, 33 are attached to the wall members 12a . . . 12g in any convenient manner so as to to be loose or slack between the members 12a . . . 12g. When the wall 12 is undeflected, slack portions of the membranes 32, 33 form ridges 34 of slack membrane in the region of the co-operable pairs of faces 21. When the wall 12 is deflected in one direction, the ridges 34 in the membrane facing away from that direction tend to become less slack, while the ridges 45 facing toward that direction tend to become more prominent. In the regions where the struts of wall members 12a . . . 12g abut, the membranes 32, 33 are more or less unattached to the wall members 12a . . . 12g so that the independent deflection of each strut 31 is not hindered by the presence of the membranes 32, 33.

In FIGURE 10, which is a view of the wall 12 of FIGURE 4 from inside the cushion space 13 (but with the inner membrane 33 removed for the sake of observation) the struts 31a are undeflected, while the strut 31b is deflected into the cushion space 13.

With reference now to FIGURE 11, it has already been mentioned that the inward and outward deflection characteristics of the flexible wall 12 are dependent on the distance of the wire 27 respectively from the laterally inner and outer edges of the flat faces 21 of each member 12a . . . 12g. As well as the wall 12 needing to be able to deflect inwardly and outwardly of the cushion space 13, it may also be desirable that deflections in substantially peripheral directions, along the cushion space boundary provided by wall 12, may take place. The same considerations will apply to peripheral deflections of the struts 31 as to the inward and outward deflections thereof; for example, the struts 31 along the sides of the vehicle 10 will need to deflect more readily towards the rear of the vehicle 10, than towards the front because obstacles will usually pass relative to these struts 31 in a rearward direction. Accordingly, the wire 27 is disposed nearer to rearward edge 150 of the flat surface 21 of the member 12c than to the forward edge 151 of the flat surface 21, the rear of the vehicle 10 being in the direction of arrow R. Although not shown, it is contemplated that the rearward edge 150 and the forward edge 151 could be profiled in the manner shown in FIGURES 4 and 5 to attain a required deflection characteristic for the strut 31.

In the alternative form of wall 12, shown in FIGURES 12 and 13, the wall members 12a . . . 12g have respective projecting portions 12a' . . . 12g' which co-operate with respective recessed or rebated portions 12a'' . . . 12g to form a gas and debris tight seal on the outwardly directed faces 26 of the wall members 12a . . . 12g. The inwardly deflected form of a wall 12 with co-operating portions 12a' . . . 12g', 12a'' . . . 12g'', is shown in FIGURE 12. Co-operating portions 12a' . . . 12g' and 12a'' . . . 12g'' may also or alternatively be formed on the inwardly directed faces 25 of the wall members 12a . . . 12g.

Although the wall members 12a . . . 12g have all been so far described and illustrated as having flat surfaces 21, the invention includes a vehicle in which the wall 12 is formed from wall members 12a . . . 12g wherein successive wall members have curved and/or flat surfaces 21, so that particular deflection-deflecting force characteristics of the wall 12 can be obtained to suit the contemplated duties of the vehicle 10.

Furthermore, the invention is applicable to a vehicle 10 in which the gas cushion is contained between the wall 12 and the surface 14 by a curtain of downwardly directed fluid. FIGURE 12 shows one non-limitative manner in which such a curtain of fluid may be formed, there being provided a number of ducts 35 spaced peripherally around the bottom of the body 11 of the vehicle 10 and a sheet-like part 36, which is preferably flexible, which defines with the wall 12 a downwardly and somewhat inwardly directed nozzle 37. The ducts 35 are connected to means for supplying fluid, either liquid, gas or both, and the fluid is passed between the wall 12 and part 36 to be downwardly and somewhat inwardly discharged from nozzle 37 as a curtain, indicated by arrow 38, which serves to contain the pressurized gas in space 13. The curtain 38 is outwardly bent by the pressure of the gas cushion. The relative disposition of the part 36 and the wall 12 is maintained by a number of septa 39 between the wall 12 and the part 36.

FIGURE 14 shows a wall 12 formed from members 12a''' . . . 12g''', these members being similar in form to the members 12a . . . 12g of FIGURES 2 and 3 but peripherally extended so that each "strut" 31 abuts the neighbouring struts 31 on either side to form a wall 12. A flexible membrane (not shown), similar to membrane 32 of FIGURE 9, may be loosely attached on the outer face of the wall 12 and another membrane (not shown), similar to membrane 33 of FIGURE 9, may be loosely attached on the inner face of the wall 12. These membranes can serve both for gas sealing and to prevent the ingress of debris between the co-operating flat faces 21 of the members 12a''' . . . 12g'''.

In the water operable gas cushion vehicle 10 of FIGURE 15, the gas cushion is bounded at the sides of the vehicle 10 by substantially parallel spaced-apart side walls 112 depending from the body 11. The walls 112 may be rigid and resemble keels, or they may be constructed in the manner described in relation to FIGURE 14.

The gas cushion is bounded at the front and rear (not visible) by walls 12 extending transversely between the side walls 112 respectively at their front and rear ends. Each wall 12 is constructed in the manner described in relation to the wall 12 of FIGURE 14 and comprises a strut 31 formed from a stack of peripherally elongated wall members 12a . . . 12g. Thus, if one strut 31 of the front wall 12 should encounter an obstacle as the vehicle 10 moves forwardly, it will be able to deflect over the obstacle so that the progress of the vehicle will not be substantially impeded. It is contemplated that either or both the front and rear walls 12 may each be formed as a number of peripherally-abutting struts 31 extending transversely between the side walls 112 so that the walls 12 may be deflected locally by obstacles, rather than as a unit, as would be the case in the embodiment shown in FIGURE 15. Furthermore, membranes (not shown) such as the membranes 32, 33 can be provided, as described in relation to FIGURE 14.

In the vehicle 10 depicted in underneath plan view in FIGURE 16, the cushion space 13 is bounded at the sides, front and rear of the vehicle 10 by longitudinal and transverse walls 112 which may be walls constructed in accordance with the invention or any other suitable type of wall. The longitudinal side walls 112 do not extend as far as the front and rear of the cushion space 13 as defined by the transverse front and rear walls, and walls 12 in accordance with this invention connect the adjacent ends of the longitudinal side walls 112 and the transverse walls 112.

Each wall 12 is constructed in the manner described in relation to FIGURES 9, 10 and 11 and comprises a number of deflectable struts 31 which are enclosed between and support an outer membrane 32 and an inner membrane 33. The membranes 32, 33 are fastened in sealing-fashion to the ends of the walls 112 so that cushion-gas from the space 13 cannot escape between the ends of the walls 112.

The walls 12 in accordance with the invention are deflectable so that they will ride over any obstacles encountered, as the vehicle 10 progresses, without there being any substantial impediment to the motion of the vehicle 10. In cases where the transverse and/or longitudinal side walls 112 are so constructed as to be deflectable, the provision of the walls 12 in the manner depicted enables each of the walls 112 to be deflected by obstacles encountered without interference from the neighbouring walls 112 or substantial losses of gas from the space 13; for instance, if the front transverse wall 112 should be deflected inwardly, it will not prevent the longitudinal side walls 112 from being deflected inwardly as would be the case were the ends of the walls 112 to be substantially abutting, and furthermore, outward deflection of the front and longitudinal side walls 112 can take place without allowing any substantial increase to take place in the losses of cushion gas between the adjacent ends of the walls 112.

In another modification (not shown) the wall members of the embodiment of FIGURES 9 and 10 are peripherally extended so that each "strut" abuts its neighbours. In this instance, the inner membrane 33 can be dispensed with; the outer membrane 32 can be retained against the ingress of debris, if desired.

Various combinations of features described hereinabove may be adopted without departing from the scope of the invention.

I claim:

1. A gas cushion vehicle comprising a body beneath which, in operation a cushion of pressurised gas is formed, and a flexible wall structure depending from the body for laterally containing at least part of the gas cushion, the wall structure comprising a plurality of wall members arranged one against the other to form a stack, a flexible element adapted to engage the wall member at one end of the stack and extending through the stack, and means for resiliently maintaining a tension in the flexible element whereby adjacent wall members in the stack are urged into abutment with each other.

2. A vehicle according to claim 1 wherein adjacent wall members are provided with substantially flat faces which normally co-operate with each other.

3. A vehicle according to claim 2 wherein at least some of the wall members have corresponding dimensions, transversely of the length of the stack, which differ, whereby some wall members may be deflected more easily than other wall members in specified directions.

4. A vehicle according to claim 2 wherein a side of at least one wall member in the stack is provided with a chamfer which defines an edge of a flat face of said wall member whereby to provide a fulcrum at said edge which is nearer to the flexible element than the said side.

5. A vehicle according to claim 2 wherein at least one wall member is provided with a raised bead on its flat face, and an adjacent wall member is provided with a notch, the bead being co-operably received in the notch and serving as a fulcrum when the two said members are angularly deflected relative to each other.

6. A vehicle according to claim 2 wherein in at least one wall member the flexible element is disposed nearer to one side of the wall member than to the opposite side, whereby the wall member may be angularly deflected, relative to an adjacent wall member, more easily to said one side than to said other side.

7. A vehicle according to claim 1 wherein at least one wall member in the stack is provided with a projection which overlaps the adjacent wall member to prevent the ingress of debris therebetween.

8. A vehicle according to claim 1 wherein the flexible element is itself resiliently extensible.

9. A vehicle according to claim 1 wherein the flexible element is relatively inextensible.

10. A vehicle according to claim 1 wherein the flexible element is anchored to said resilient means for maintaining the tension in the flexible element.

11. A vehicle according to claim 10 including means associated with said resilient means for temporarily relieving the tension in the flexible element during operational use.

12. A vehicle according to claim 11 wherein the resilient means includes a compression spring, said relieving means being operable to compress said spring.

13. A vehicle according to claim 11 including control means which respond to a signal indicative of an obstacle in the path of the wall structure whereby to operate said relieving means.

14. A vehicle according to claim 1 including a flexible impervious membrane co-operating with one side of two adjacent wall members so as to provide a gas-tight seal between said two adjacent wall members.

15. A vehicle according to claim 1 wherein the wall structure includes a plurality of spaced-apart parallel struts each of which is in the form of a stack of wall members, and a membrane of impervious flexible sheet material co-operating with and extending between at least two adjacent struts whereby to provide a cushion-containing membrane between said two adjacent struts.

16. A vehicle according to claim 1 wherein the wall structure includes a plurality of stacks of wall members, each wall member having a length, longitudinally of the length of the structure, which is relatively large in comparison with its width transversely of the wall structure.

17. A gas cushion vehicle comprising a body beneath which, in operation, a cushion of pressurised gas is formed, a longitudinal wall depending from each longitudinal side of the body to contain the sides of the gas cushion, a transverse wall depending from one longitudinal end of the body to contain the cushion at at least one of its longitudinal ends, a flexible wall structure depending from the body between adjacent ends of said transverse wall and a side wall, the flexible wall structure comprising a plurality of wall members arranged one against the other to form a stack, a flexible element adapted to engage the wall member at one end of the stack and extending through the stack, and means for resiliently maintaining a tension in the flexible element whereby adjacent wall members in the stack are urged into abutment with each other, and an impervious membrane of flexible sheet material which co-operates with the said adjacent ends of the wall and the flexible wall structure, the flexible wall structure serving to support said membrane in a desired configuration whereby said membrane serves in operation to contain the gas cushion between the said ends of the walls.

18. A vehicle according to claim 17 wherein said transverse wall is provided by a flexible wall structure.

19. A vehicle according to claim 17 wherein said longitudinal side walls are each provided by a flexible wall structure.

20. A gas cushion vehicle comprising a body beneath which, in operation, a cushion of pressurised gas is formed, walls of rigid material depending from each longitudinal side of the body so as to laterally define the opposite sides of a space for said gas cushion, and a flexible wall structure depending from one of the longitudinal ends of the body and extending between the longitudinal side walls of one of the ends thereof, the flexible wall structure comprising a plurality of wall members arranged one on top of each other in a stack, at least one flexible element adapted to engage the lowest wall member in the stack and extending upwardly through the stack, resilient means disposed in the vehicle body above the stack, said flexible element being engaged with said resilient means whereby to maintain a tension in the flexible element whereby adjacent wall members in the stack are urged into abutment with each other.

References Cited
UNITED STATES PATENTS

| | | | |
|---|---|---|---|
| 2,453,646 | 11/1948 | Tomlin et al. | 46—123 |
| 3,219,135 | 11/1965 | Bunting et al. | 180—127 |
| 3,258,080 | 6/1966 | Williams et al. | 180—127 |

A. HARRY LEVY, *Primary Examiner.*